US012698355B2

(12) United States Patent
Fukuyama et al.

(10) Patent No.: US 12,698,355 B2
(45) Date of Patent: Aug. 4, 2026

(54) VINYL ALCOHOL POLYMER, METHOD FOR PRODUCING VINYL ALCOHOL POLYMER, DISPERSANT FOR SUSPENSION POLYMERIZATION, DISPERSION AID FOR SUSPENSION POLYMERIZATION, AND METHOD FOR PRODUCING VINYL POLYMER

(71) Applicant: KURARAY CO., LTD., Kurashiki (JP)

(72) Inventors: Misuzu Fukuyama, Kurashiki (JP); Masaki Kato, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 644 days.

(21) Appl. No.: 18/247,389

(22) PCT Filed: Sep. 28, 2021

(86) PCT No.: PCT/JP2021/035708
§ 371 (c)(1),
(2) Date: Mar. 30, 2023

(87) PCT Pub. No.: WO2022/071345
PCT Pub. Date: Apr. 7, 2022

(65) Prior Publication Data

US 2024/0002565 A1 Jan. 4, 2024

(30) Foreign Application Priority Data

Oct. 2, 2020 (JP) ................................ 2020-167720

(51) Int. Cl.

| | |
|---|---|
| ***C08F 216/06*** | (2006.01) |
| ***C08F 2/20*** | (2006.01) |
| ***C08F 2/38*** | (2006.01) |
| ***C08F 8/12*** | (2006.01) |
| ***C08F 14/06*** | (2006.01) |

(52) U.S. Cl.
CPC .............. *C08F 216/06* (2013.01); *C08F 2/20* (2013.01); *C08F 2/38* (2013.01); *C08F 8/12* (2013.01); *C08F 14/06* (2013.01)

(58) Field of Classification Search
CPC ........ C08F 216/06; C08F 2/20; C08F 218/08; C08F 18/08; C08F 2/02; C08F 2/38; C08F 8/12; C08F 14/06
See application file for complete search history.

(56) References Cited

U.S. PATENT DOCUMENTS

| | | | |
|---|---|---|---|
| 2015/0152256 A1 | 6/2015 | Nakazawa et al. | |
| 2017/0198068 A1 | 7/2017 | Kozuka et al. | |
| 2021/0179757 A1* | 6/2021 | Watanabe ................. | C08F 2/20 |

FOREIGN PATENT DOCUMENTS

| | | | |
|---|---|---|---|
| EP | 2 862 897 | A1 | 4/2015 |
| EP | 3 686 224 | A1 | 7/2020 |
| JP | 61-89208 | B2 | 5/1986 |
| TW | 2014-00511 | * | 1/2014 |
| TW | 201400511 | A | 1/2014 |
| TW | 201406847 | A | 2/2014 |
| WO | WO2013/187455 | | 12/2013 |
| WO | WO2015/182567 | | 12/2015 |
| WO | WO 2018/096937 | A1 | 5/2018 |
| WO | WO 2019/156006 | * | 8/2019 |
| WO | WO 2019/156006 | A1 | 8/2019 |

OTHER PUBLICATIONS

Taghizadeh, Journal of Applied Polymer Science, vol. 132, issue 25, 2015, p. 42117 (1-12) (Year: 2015).*
Translation of TW 2014-00511 (Year: 2014).*
Extended European Search Report issued Oct. 7, 2024 in European Patent Application No. 21875646.8, 8 pages.
International Search Report and Written Opinion issued Dec. 7, 2021 in PCT/JP2021/035708 (with English translation), 11 pages.

* cited by examiner

*Primary Examiner* — Robert C Boyle
(74) *Attorney, Agent, or Firm* — Oblon, McClelland, Maier & Neustadt, L.L.P.

(57) ABSTRACT

A vinyl alcohol polymer including, in the same molecule or in different molecules, a carbonyl group, a formyl group, and an alkenyl group. A method for producing a vinyl alcohol polymer, including polymerizing a vinyl ester in a presence of an unsaturated aliphatic aldehyde to obtain a vinyl ester polymer, and saponifying the vinyl ester polymer.

20 Claims, No Drawings

VINYL ALCOHOL POLYMER, METHOD FOR PRODUCING VINYL ALCOHOL POLYMER, DISPERSANT FOR SUSPENSION POLYMERIZATION, DISPERSION AID FOR SUSPENSION POLYMERIZATION, AND METHOD FOR PRODUCING VINYL POLYMER

CROSS REFERENCE TO RELATED APPLICATIONS

This application is a National Stage entry under 35 U.S.C. § 371 of PCT/JP2021/035708, filed on Sep. 28, 2021, and claims priority to Japanese Patent Application No. 2020-167720, filed on Oct. 2, 2020. The entire contents of both are incorporated herein by reference.

TECHNICAL FIELD

The present invention relates to a vinyl alcohol polymer, a method for producing a vinyl alcohol polymer, a dispersant for suspension polymerization, a dispersion aid for suspension polymerization, and a method for producing a vinyl polymer.

BACKGROUND ART

Polyvinyl alcohol polymers (hereinafter, may be also referred to as "PVAs") are known as water-soluble synthetic macromolecules. PVAs are used in various types of intended usages as materials for films and fibers, additives for paper processing and fiber processing, adhesives, dispersants (may be also referred to as dispersion stabilizers, etc.) and dispersion aids for emulsion polymerization and suspension polymerization, binders for inorganic substances, and the like.

In order to, e.g., enhance performance of PVAs, practical application and development of variously modified PVAs have been carried out. For example, Patent Document 1 discloses a dispersion stabilizer for suspension polymerization comprising a polyvinyl alcohol-based polymer (B) which has a double bond in a side chain and which is obtainable by acetalization of a polyvinyl alcohol-based polymer (A) with a monoaldehyde having an unsaturated olefinic double bond.

Prior Art Documents

Patent Documents

Patent Document 1: PCT International Publication No. 2015/182567

SUMMARY OF THE INVENTION

Problems to Be Solved by the Invention

In order to achieve, e.g., even higher performance of a PVA, there is a demand for development of a novel PVA. For example, in a case in which a PVA is used as a dispersant for suspension polymerization, it is desirable, for example, to obtain polymer particles which have particle diameters being small and uniform, and are superior in plasticizer absorptivity.

It is an object of the present invention to provide: a novel vinyl alcohol polymer and a method for producing the same; and a dispersant for suspension polymerization, a dispersion aid for suspension polymerization, and a method for producing a vinyl polymer, each of which enables obtaining polymer particles which are superior in plasticizer absorptivity, and in which an average particle diameter is small, with few coarse particles.

Means for Solving the Problems

The aforementioned problems can be solved by providing any of the following:

(1) A vinyl alcohol polymer having, in the same molecule or in different molecules, a carbonyl group, a formyl group, and an alkenyl group;

(2) The vinyl alcohol polymer according to (1), having a structure represented by the following formula (1) containing the carbonyl group:

(1)

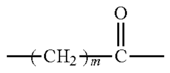

wherein, in the formula (1), m is an integer of 1 to 11, (3) A vinyl alcohol polymer having, at an end of a polymer chain, a group represented by the following formula (2):

(2)

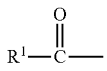

wherein, in the formula (2), $R^1$ represents an alkenyl group;

(4) The vinyl alcohol polymer according to (3), wherein the alkenyl group represented by $R^1$ in the formula (2) has a methylene group at an end of the carbonyl group side;

(5) The vinyl alcohol polymer according to any one of (1) to (4), having a tertiary carbon atom;

(6) The vinyl alcohol polymer according to any one of (1) to (5), having a structural unit derived from an unsaturated aliphatic aldehyde;

(7) The vinyl alcohol polymer according to (6), wherein the unsaturated aliphatic aldehyde has 3 to 14 carbon atoms;

(8) The vinyl alcohol polymer according to (6) or (7), wherein the unsaturated aliphatic aldehyde has, at an end thereof, a carbon-carbon double bond;

(9) A method for producing a vinyl alcohol polymer, the method including: a step of polymerizing a vinyl ester in the presence of an unsaturated aliphatic aldehyde; and a step of saponifying a vinyl ester polymer obtained;

(10) A dispersant for suspension polymerization, the dispersant containing the vinyl alcohol polymer according to any one of (1) to (8);

(11) A dispersion aid for suspension polymerization, the dispersion aid containing the vinyl alcohol polymer according to any one of (1) to (8); and

(12) A method for producing a vinyl polymer, the method including a step of polymerizing a vinyl compound in the presence of the vinyl alcohol polymer according to any one of (1) to (8).

Effects of the Invention

The present invention enables providing a novel vinyl alcohol polymer and a method for producing the same; and a dispersant for suspension polymerization, a dispersion aid for suspension polymerization, and a method for producing a vinyl polymer, each of which enables obtaining polymer particles which are superior in plasticizer absorptivity, and in which the average particle diameter is small, with few coarse particles.

DESCRIPTION OF EMBODIMENTS

Vinyl Alcohol Polymer

A vinyl alcohol polymer (PVA) according to a first embodiment of the present invention has, in the same molecule or in different molecules, a carbonyl group, a formyl group, and an alkenyl group. In the PVA, it is not necessary that the carbonyl group, the formyl group, and the alkenyl group are all contained in one molecule. In other words, for example, the PVA may be a mixture of: a PVA (a) which has two groups from the carbonyl group, the formyl group, and the alkenyl group; and a PVA (b) which has the one remaining group. In this case, both the PVA (a) and the PVA (b) may have one or more groups from the carbonyl group, the formyl group, and the alkenyl group. The PVA may be a mixture of 3 or more types of PVAs. It is to be noted that the mode of the PVA having all of the carbonyl group, the formyl group, and the alkenyl group in one molecule; and the mode of the mixture consisting of multiple types of PVAs, this mixture having the carbonyl group, the formyl group, and the alkenyl group, have substantially the same properties, and further, typically, it is extremely difficult, in general, to discriminate between these two modes by analysis or the like.

The PVA is a polymer having a vinyl alcohol unit as a structural unit. Typically, as described later, the PVA is obtained by: polymerizing a vinyl ester in the presence of an unsaturated aliphatic aldehyde; and saponifying a vinyl ester polymer obtained. The lower limit of a degree of saponification of the PVA is, for example, 20 mol % and may be 30 mol % or 40 mol %, and is preferably 50 mol %, more preferably 60 mol %, and still more preferably 70 mol %. On the other hand, the upper limit of the degree of saponification may be 100 mol %, and is preferably 95 mol %, more preferably 90 mol %, still more preferably 85 mol %, and yet more preferably 80 mol %. When the degree of saponification of the PVA falls within the above range, owing to surface active performance becoming suitable and the like, various types of performance in the case of using the PVA as, e.g., a dispersant for suspension polymerization (obtaining polymer particles which are superior in plasticizer absorptivity, and in which the average particle diameter is small, with few coarse particles, etc.) can be improved. On the other hand, in the case in which the PVA is used as the dispersion aid for suspension polymerization, the lower limit of the degree of saponification of the PVA is, for example, preferably 20 mol %, and preferably 30 mol %. The upper limit of the degree of saponification of the PVA in such a case is, for example, preferably 80 mol %, more preferably 70 mol %, and may be still more preferably 60 mol %. The degree of saponification is a value measured in accordance with a method described in JIS K6726: 1994.

The carbonyl group (—C(═O)—) contained in the PVA is a divalent group in which two atomic bonds both bond to a carbon atom. In other words, —C(═O)— in the formyl group (—C(═O)H) is not included in the carbonyl group contained in the PVA. The PVA preferably has a structure represented by the following formula (1) containing the carbonyl group.

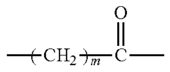

(1)

In the formula (1), m is an integer of 1 to 11. m is preferably an integer of 2 to 9, and may be preferably an integer of 3 to 7.

It is to be noted that in the present description, numerical value ranges described using "to" mean that numerical values before and after "to" are included as the lower limit value and the upper limit value, respectively.

A content of the carbonyl group with respect to a total content of the vinyl alcohol unit and the vinyl ester unit in the PVA is preferably 0.001 mol % or more and 5 mol % or less, more preferably 0.005 mol % or more and 1 mol % or less, still more preferably 0.008 mol % or more and 0.1 mol % or less, and yet more preferably 0.01 mol % or more and 0.05 mol % or less. In the case in which the content of the carbonyl group in the PVA falls within the above range, various types of performance in the case of using the PVA as, e.g., a dispersant for suspension polymerization or the like can be improved. The content of the carbonyl group is a value determined in accordance with a procedure disclosed in EXAMPLES, described later.

The formyl group contained in the PVA is a monovalent group represented by —C(═O)H.

A content of the formyl group with respect to a total content of the vinyl alcohol unit and the vinyl ester unit in the PVA is preferably 0.01 mol % or more and 5 mol % or less, more preferably 0.03 mol % or more and 3 mol % or less, still more preferably 0.05 mol % or more and 2 mol % or less, and yet more preferably 0.07 mol % or more and 1 mol % or less. In the case in which the content of the formyl group in the PVA falls within the above range, various types of performance in the case of using the PVA as, e.g., a dispersant for suspension polymerization or the like can be improved. The content of the formyl group is a value determined in accordance with a procedure disclosed in EXAMPLES, described later.

The alkenyl group contained in the PVA is a monovalent group derived from an alkene by removing one arbitrary hydrogen atom. The number of carbon atoms in the alkenyl group is preferably 2 to 13, more preferably 3 to 12, still more preferably 4 to 11, and may be yet more preferably 5 to 9. The alkenyl group may be linear or may have a branched structure, and is preferably linear. The alkenyl group is preferably positioned at an end of a polymer chain.

The alkenyl group contained in the PVA preferably has, at an end (extremity) thereof, a carbon-carbon double bond. In other words, the PVA preferably has, at an end (extremity) thereof, a vinyl group. The alkenyl group contained in the PVA is more preferably a group represented by the following formula (5).

$$H_2C{=}CH-(CH_2)_n- \quad (5)$$

In the formula (5), n is an integer of 1 to 11 n is preferably an integer of 2 to 9, and may be more preferably an integer of 3 to 7.

A content of the alkenyl group with respect to a total content of the vinyl alcohol unit and the vinyl ester unit in the PVA is preferably 0.005 mol % or more and 5 mol % or less, more preferably 0.01 mol % or more and 3 mol % or less, still more preferably 0.02 mol % or more and 1 mol % or less, and may be yet more preferably 0.03 mol % or more and 0.5 mol % or less. In the case in which the content of the alkenyl group in the PVA falls within the above range, various types of performance in the case of using the PVA as, e.g., a dispersant for suspension polymerization can be improved. The content of the alkenyl group is a value determined in accordance with a procedure disclosed in EXAMPLES, described later. A range of the suitable content of the vinyl group with respect to the total content of the vinyl alcohol unit and the vinyl ester unit in the PVA is the same as the range of the suitable content of the alkenyl group.

The PVA preferably has a terminal group derived from an unsaturated aliphatic aldehyde, or a structural unit derived from an unsaturated aliphatic aldehyde. The number of carbon atoms of the unsaturated aliphatic aldehyde is preferably 3 to 14, more preferably 4 to 12, and may be still more preferably 6 to 10.

The unsaturated aliphatic aldehyde preferably has a carbon-carbon double bond, and more preferably has a carbon-carbon double bond at an end (extremity) thereof. More specifically, the unsaturated aliphatic aldehyde preferably contains a vinyl group. The unsaturated aliphatic aldehyde having the carbon-carbon double bond is preferably an alkenyl group having a methylene group at an end of the carbonyl group side, i.e., an unsaturated aliphatic aldehyde having a group represented by R—$CH_2$— (wherein R represents an alkenyl group). In other words, the unsaturated aliphatic aldehyde is preferably an unsaturated aliphatic aldehyde other than α,β-unsaturated aldehydes. When the unsaturated aliphatic aldehyde having a structure as described above is used, reactivity during polymerization can be improved, whereby a PVA in which a sufficient amount of a functional group (carbonyl group, etc.) has been incorporated can be effectively obtained.

The unsaturated aliphatic aldehyde is particularly preferably a compound represented by the following formula (6).

(6)

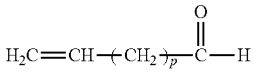

In the formula (6), p is an integer of 1 to 11. p is preferably an integer of 2 to 9, and may be more preferably an integer of 3 to 7.

Examples of the unsaturated aliphatic aldehyde include 2-propenal, 3-butenal, 4-pentenal, 5-hexenal, 3-methyl-5-hexanal, 6-heptenal, 6-octenal, 7-octenal, 7-methyl-7-octenal, 3,7-dimethyl-7-octenal, 8-nonenal, 9-decenal, 10-undecenal, 11-dodecenal, and the like.

Examples of the terminal group derived from the unsaturated aliphatic aldehyde which is preferably contained in the PVA include a group represented by the following formula (2).

(2)

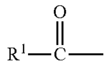

In the formula (2), $R^1$ represents an alkenyl group.

The number of carbon atoms in the alkenyl group represented by $R^1$ in the formula (2) is preferably 2 to 13, more preferably 3 to 12, still more preferably 4 to 11, and may be yet more preferably 5 to 9. The alkenyl group represented by $R^1$ may be linear or may have a branched structure, and is preferably linear. The alkenyl group represented by $R^1$ is preferably a group having a methylene group (a group represented by (R—$CH_2$— (wherein R represents an alkenyl group)) at an end of the carbonyl group side, more preferably a group having a carbon-carbon double bond at an end (extremity) thereof, and still more preferably a group represented by the above formula (5). The terminal group represented by the formula (2) is typically formed in a case in which the unsaturated aliphatic aldehyde acts as a chain transfer agent.

Examples of the structural unit derived from the unsaturated aliphatic aldehyde which is preferably contained in the PVA include a structural unit represented by the following formula (3) or (4).

(3)

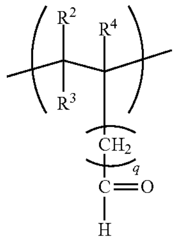

(4)

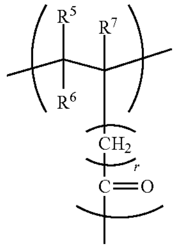

In the formula (3) and the formula (4), $R^2$ to $R^7$ each independently represent a hydrogen atom or an alkyl group having 1 to 3 carbon atoms; q is an integer of 1 to 11; and r is an integer of 1 to 11.

In the formula (3), $R^2$ to $R^4$ each represent preferably a hydrogen atom; and q is preferably an integer of 2 to 9 and may be more preferably an integer of 3 to 7. The structural unit represented by the formula (3) is typically formed in a case in which the unsaturated aliphatic aldehyde acts as monomer, whereby the structural unit is incorporated into the polymer chain.

In the formula (4), $R^5$ to $R^7$ each represent preferably a hydrogen atom; and r is preferably an integer of 2 to 9 and may be more preferably an integer of 3 to 7. The structural unit represented by formula (4) is typically formed in a case in which the formyl group in the structural unit represented by the above formula (3) further acts as a chain transfer agent.

The PVA preferably has a tertiary carbon atom (a carbon atom directly attached to three carbon atoms). Furthermore, the PVA preferably has a structural unit containing a tertiary carbon atom. In such a case, i.e., in a case in which the PVA has a branched structure, various types of performance can improve in the case of using the PVA as, e.g., a dispersant for suspension polymerization. In the case in which, for example, the PVA has the structural unit represented by the above formula (3) or (4) and each of $R^2$ to $R^7$ represents a hydrogen atom, the PVA has a tertiary carbon atom.

The PVA may have an other structural unit aside from structural units derived from a vinyl ester (a vinyl alcohol unit and a vinyl ester unit) and the structural unit derived from the unsaturated aliphatic aldehyde. Examples of a monomer that gives the other structural unit include: α-olefins such as ethylene, propylene, 1-butene, isobutene, and 1-hexene; acrylic acid and methacrylic acid; acrylic acid esters such as methyl acrylate and ethyl acrylate; methacrylic acid esters such as methyl methacrylate and ethyl methacrylate; acrylamide derivatives such as N-methylacrylamide, N-ethylacrylamide, and 2-acrylamide-2-methylpropanesulfonate; methacrylamide derivatives such as N-methylmethacrylamide and N-ethylmethacrylamide; maleic acid; maleic acid esters such as monomethyl maleate and dimethyl maleate; fumaric acid; fumaric acid esters such as monomethyl fumarate and dimethyl fumarate; itaconic acid; 3,4-diacetoxy-1-butene; vinyl ethers such as methyl vinyl ether, ethyl vinyl ether, n-propyl vinyl ether, isopropyl vinyl ether, and n-butyl vinyl ether; hydroxy group-containing vinyl ethers such as ethylene glycol vinyl ether, 1,3-propanediol vinyl ether, and 1,4-butanediol vinyl ether; allyl acetate; allyl ethers such as propyl allyl ether, butyl allyl ether, and hexyl allyl ether; monomers having an oxyalkylene group; isopropenyl acetate; hydroxy group-containing α-olefins such as 3-buten-1-ol, 4-penten-1-ol, 5-hexen-1-ol, 7-octen-1-ol, 9-decen-1-ol, and 3-methyl-3-buten-1-ol; monomers having a silyl group, such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide propyltrimethoxysilane, and 3-(meth)acrylamide propyltriethoxysilane, and the like.

A proportion accounted for by the other structural unit in total structural units in the PVA may be preferably 20 mol % or less, may be more preferably 10 mol % or less, and may be still more preferably 5 mol % or 1 mol %. On the other hand, the proportion accounted for by the other monomer structural unit may be, for example, 0.1 mol % or more, or may be 1 mol % or more.

The lower limit of a viscosity-average degree of polymerization of the PVA may be, for example, 50 or 100, and is preferably 200, more preferably 300, still more preferably 400, and may be yet more preferably 500. When the viscosity-average degree of polymerization is more than or equal to the lower limit, a protective colloid property can increase, and various types of performance in the case of using the PVA as, e.g., a dispersant for suspension polymerization can improve. On the other hand, the upper limit of this viscosity-average degree of polymerization is preferably 2,000, more preferably 1,500, still more preferably 1,000, and yet more preferably 800. When the viscosity-average degree of polymerization is less than or equal to the upper limit, the surface active performance can increase, and various types of performance in the case of using the PVA as, e.g., a dispersant for suspension polymerization can improve. On the other hand, in the case of using the PVA as a dispersion aid for suspension polymerization, the lower limit of the viscosity-average degree of polymerization of the PVA is, for example, preferably 50, more preferably 70, still more preferably 100, yet more preferably 120, particularly preferably 160, and may be extremely preferably 200. The upper limit of the viscosity-average degree of polymerization of the PVA in such a case is, for example, preferably 800, more preferably 700, and still more preferably 600. The viscosity-average degree of polymerization is a value measured based on JIS K6726: 1994. Specifically, the viscosity-average degree of polymerization can be determined by the following equation, using a limiting viscosity [η] (unit: L/g) measured in water at 30° C. on the PVA, having been re-saponified until the degree of saponification becomes 99.5 mol % or more and then purified:

$$\text{viscosity-average degree of polymerization} = ([\eta] \times 10^4/8.29)^{(1/0.62)}$$

The PVA according to a second embodiment of the present invention has, at an end of a polymer chain, a group represented by the following formula (2).

(2)

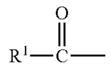

In the formula (2), $R^1$ represents an alkenyl group. Specific modes and suitable modes of the group (terminal group) represented by the above formula (2) are as described above. As described above, when the vinyl ester is polymerized in the presence of the unsaturated aliphatic aldehyde, the group represented by the above formula (2) is incorporated into an end of a polymer chain in the case in which the unsaturated aliphatic aldehyde acts as a chain transfer agent. The PVA may consist of one type of PVA alone, or may be a mixture of two or more types of PVAs. Aside from not necessitating "having a carbonyl group, a formyl group, and an alkenyl group in the same molecule or in different molecules," specific modes and suitable modes of the PVA according to the second embodiment of the present invention are similar to the specific modes and suitable modes of the PVA according to the first embodiment of the present invention, described above.

The PVA of the present invention may have a carbon-carbon double bond in addition to the alkenyl group, and in particular, preferably has a structure represented by $-CO-(CH{=}CH)p-$ (wherein p is an integer of 1 to 5). Such a structure is, for example, incorporated by means of a heat treatment of the PVA of the present invention.

The PVA of the present invention may be used in various intended usages similar to those of the conventionally well-known PVAs, such as materials for films and fibers, additives for paper processing and fiber processing, adhesives, dispersants and dispersion aids for emulsion polymerization and suspension polymerization, binders for inorganic substances, and the like. Of these, as explained in detail later, the PVA of the present invention can be particularly suitably used as a dispersant for suspension polymerization of, e.g., a vinyl compound and a dispersion aid for suspension polymerization of, e.g., a vinyl compound.

Method for Producing Vinyl Alcohol Polymer

A method for producing a vinyl alcohol polymer of the present invention includes:

a step (Step A) of polymerizing a vinyl ester in the presence of an unsaturated aliphatic aldehyde; and a step (Step B) of saponifying a vinyl ester polymer obtained.

Step A

In Step A, a vinyl ester is polymerized in the presence of an unsaturated aliphatic aldehyde to give a vinyl ester polymer. A procedure of polymerizing the vinyl ester is exemplified by a well-known procedure such as bulk polymerization, solution polymerization, suspension polymerization, emulsion polymerization, and the like. Of these procedures, the bulk polymerization performed without a solvent and the solution polymerization performed with a solvent such as an alcohol or the like are preferred. The alcohol is preferably an alcohol having 3 or fewer carbon atoms; more preferably methanol, ethanol, n-propanol, or isopropanol; and still more preferably methanol. In carrying out a polymerization reaction by these procedures, either of a batchwise system or a continuous system can be employed as a reaction system. A polymerization temperature at a time of conducting the polymerization reaction is not particularly limited, and a range of 5° C. or more and 200° C. or less is appropriate.

Examples of the vinyl ester include vinyl formate, vinyl acetate, vinyl propionate, vinyl valerate, vinyl caprate, vinyl laurate, vinyl stearate, vinyl benzoate, vinyl pivalate, vinyl versatate, and the like. Of these, vinyl acetate is preferred.

Examples of a polymerization initiator to be used in the polymerization reaction include well-known polymerization initiators, e.g., azo initiators such as 2,2'-azobisisobutyronitrile, 2,2'azobis(2,4-dimethylvaleronitrile), and 2,2'azobis(4-methoxy-2,4-dimethylvaleronitrile); organic peroxide initiators such as benzoyl peroxide, n-propyl peroxycarbonate, and diisopropyl peroxydicarbonate; and the like. A usage amount of the polymerization initiator is, for example, preferably 0.01 to 5% by mass with respect to the vinyl ester to be used.

Specific examples and suitable examples of the unsaturated aliphatic aldehyde to be present at the time of polymerizing the vinyl ester are as described above. One, or two or more types of the unsaturated aliphatic aldehyde may be used. A usage amount of the unsaturated aliphatic aldehyde is, for example, preferably 0.1 to 10% by mass with respect to the vinyl ester. At the time of polymerizing the vinyl ester, an other chain transfer agent aside from the unsaturated aliphatic aldehyde, or the like may also be present. Examples of the other chain transfer agent include: saturated aliphatic aldehydes such as acetaldehyde, propionaldehyde, butylaldehyde, 1-pentanal, 1-hexanal, 1-octanal, 1-nonanal, and 1-decanal; ketones such as acetone and methyl ethyl ketone; mercaptans such as 2-hydroxyethanethiol and 3-mercaptopropionic acid; thiocarboxylic acids such as thioacetic acid; halogenated hydrocarbons such as trichloroethylene and perchloroethylene; and the like.

At the time of polymerizing the vinyl ester, a copolymerizable monomer can be further copolymerized within a range not impairing the principles of the present invention. Such a copolymerizable monomer may be exemplified by those described above as the monomer that gives the other structural unit.

Step B

In Step B, the vinyl ester polymer obtained in Step A is saponified, for example, in an alcohol solution using an alkali catalyst or an acid catalyst to give the PVA. For the saponification reaction of the vinyl ester polymer, an alcoholysis reaction or a hydrolysis reaction may be adopted, each using: a conventionally well-known basic catalyst such as sodium hydroxide, potassium hydroxide, or sodium methoxide; or a conventionally well-known acidic catalyst such as p-toluenesulfonate. Examples of the solvent to be used in the saponification reaction include: alcohols such as methanol and ethanol; esters such as methyl acetate and ethyl acetate; ketones such as acetone and methyl ethyl ketone; aromatic hydrocarbons such as benzene and toluene; and the like. These may be used either alone of one type, or in a combination of two or more types thereof. Of these, due to convenience, it is preferable to use methanol or a mixed solution of methanol and methyl acetate as the solvent, and to conduct the saponification reaction in the presence of sodium hydroxide which serves as the basic catalyst. The saponifying can be conducted using a belt type reactor, a kneader type reactor, a tower type reactor, or the like.

By way of Step B, a resin solid containing the PVA is obtained. The method for producing a vinyl alcohol polymer may further have, as step(s) after Step B: a step of washing the resin solid containing the PVA; a step of drying the resin solid containing the PVA; a step of subjecting the resin solid containing the PVA to a heat treatment; and/or the like.

Dispersant for Suspension Polymerization

The dispersant for suspension polymerization of the present invention (hereinafter, may be also referred to as the "dispersant") contains the PVA of the present invention, described above. The dispersant as referred to herein means an additive for use in: enhancing monomer dispersability at a time of suspension polymerization; controlling particle diameters of polymer particles to be obtained; and the like. The lower limit of a content of the PVA among nonvolatile components in the dispersant of the present invention is preferably 30% by mass, more preferably 50% by mass, and may be still more preferably 70% by mass, 90% by mass, or 99% by mass. The upper limit of the content of the PVA among the nonvolatile components in the dispersant of the present invention may be 100% by mass. The nonvolatile components other than the PVA which may be contained in the dispersant of the present invention are exemplified by: PVAs other than the PVA of the present invention; resins other than the PVA(s); additives such as surfactants and plasticizers; compounds used during production; and the like. The lower limit of a content of total PVAs among the nonvolatile components in the dispersant of the present invention is preferably 50% by mass, more preferably 70% by mass, and may be still more preferably 80% by mass, 90% by mass, or 99% by mass. The upper limit of the content of the total PVAs among the nonvolatile components in the dispersant of the present invention may be 100% by mass. Furthermore, a content of volatile components in the dispersant of the present invention is typically 20% by mass or less, preferably 15% by mass or less, and more preferably 10% by mass or less. Volatile components which may be contained in the dispersant of the present invention are exemplified by alcohols, water, and the like. In other words, the dispersant of the present invention may be constituted from substantially only the PVA of the present invention. A form of the dispersant of the present invention is not particularly limited, and is typically a powder.

The dispersant of the present invention is suitable as a dispersant for suspension polymerization of a vinyl compound. When the dispersant of the present invention is used, polymerization stability can improve, thereby enabling efficiently obtaining polymer particles in which the average particle diameter is small, with few coarse particles. Furthermore, the polymer particles to be obtained by suspension polymerization using the dispersant of the present invention are also favorable in plasticizer absorptivity.

Dispersion Aid for Suspension Polymerization

The dispersion aid for suspension polymerization of the present invention (hereinafter, may be also referred to as the "dispersion aid") contains the PVA of the present invention, described above. The dispersion aid as referred to herein means an additive typically used together with the dispersant in order to, e.g., particularly increase a porosity of the polymer particles to be obtained. Furthermore, by using the dispersion aid together with the dispersant, the dispersability can be further improved. The lower limit of a content of the PVA among nonvolatile components in the dispersion aid of the present invention is preferably 30% by mass, more preferably 50% by mass, and may be still more preferably 70% by mass, 90% by mass, or 99% by mass. The upper limit of the content of the PVA among the nonvolatile components in the dispersion aid of the present invention may be 100% by mass. The nonvolatile components other than the PVA which may be contained in the dispersion aid of the present invention are exemplified by: PVAs other than the PVA of the present invention; resins other than the PVA(s); additives such as surfactants and plasticizers; compounds used during production; and the like. The lower limit of a content of total PVAs among the nonvolatile components in the dispersion aid of the present invention is preferably 50% by mass, more preferably 70% by mass, and may be still more preferably 80% by mass, 90% by mass, or 99% by mass. The upper limit of the content of the total PVAs among the nonvolatile components in the dispersion aid of the present invention may be 100% by mass. Furthermore, a content of volatile components in the dispersion aid of the present invention is typically 20% by mass or less, preferably 15% by mass or less, and more preferably 10% by mass or less. Volatile components which may be contained in the dispersion aid of the present invention are exemplified by alcohols, water, and the like. In other words, the dispersion aid of the present invention may be constituted from substantially only the PVA of the present invention. A form of the dispersion aid of the present invention is not particularly limited, and is typically a powder.

The dispersion aid of the present invention is suitable as a dispersion aid for suspension polymerization of a vinyl compound. When the dispersion aid of the present invention is used, polymerization stability can improve, thereby enabling efficiently obtaining polymer particles in which the average particle diameter is small, with few coarse particles. Furthermore, the polymer particles to be obtained by suspension polymerization using the dispersion aid of the present invention are also favorable in plasticizer absorptivity.

Method for Producing Vinyl Polymer

The method for producing a vinyl polymer of the present invention includes a step of subjecting a vinyl compound to suspension polymerization using the PVA of the present invention (the dispersant or the dispersion aid of the present invention). The method for producing a vinyl polymer is similar to well-known methods for producing a vinyl polymer, except that the PVA of the present invention is used as the dispersant or the dispersion aid.

In the method for producing a vinyl polymer of the present invention, typically, the vinyl compound is subjected to suspension polymerization in an aqueous medium using the PVA of the present invention. As the aqueous medium, aside from pure water, an aqueous solution containing various types of additive components, or an aqueous medium containing another organic solvent may be used.

In conducting the suspension polymerization of the vinyl compound, an amount of the PVA of the present invention to be added is not particularly limited, and is, on a mass basis with respect to the vinyl compound, preferably 100 ppm or more and 50,000 ppm or less, more preferably 200 ppm or more and 20,000 ppm or less, and may be still more preferably ppm or less, 5,000 ppm or less, or 2,000 ppm or less.

The PVA of the present invention may be used alone, or in combination with an other dispersant or the like. The other dispersant or the like is exemplified by: water-soluble polymers, e.g., water-soluble cellulose ethers which are typically used in subjecting a vinyl compound to suspension polymerization in an aqueous medium, such as methyl cellulose, hydroxyethyl cellulose, hydroxypropyl cellulose, and hydroxypropyl methyl cellulose, as well as a PVA other than the PVA of the present invention, and gelatin; oil-soluble emulsifiers such as sorbitan monolaurate, sorbitan trioleate, glycerin tristearate, and an ethylene oxide-propylene oxide block copolymer; water-soluble emulsifiers such as polyoxyethylene sorbitan monolaurate, polyoxyethylene glycerin oleate, and sodium laurate; and the like.

As a polymerization initiator to be used in the method for producing a vinyl polymer of the present invention, a polymerization initiator which is conventionally used in polymerization of a vinyl compound may be used; and specifically, a polymerization initiator similar to those exemplified in relation to the polymerization of the vinyl ester monomer described above may be used.

In the method for producing a vinyl polymer of the present invention, other various other types of additives may be added to the polymerization system as necessary. Examples of the additives include: polymerization modifiers such as aldehydes, halogenated hydrocarbons, and mercaptans; polymerization inhibitors such as phenol compounds, sulfur compounds, and N-oxide compounds; and the like. Furthermore, a pH adjuster, a scale inhibitor, a cross-linking agent, and/or the like may also be added. A plurality of the above-mentioned additives may be used in combination.

Examples of the vinyl compound which can be subjected to the suspension polymerization in the method for producing a vinyl polymer of the present invention include: halogenated vinyls such as vinyl chloride; vinyl esters such as vinyl acetate and vinyl propionate; acrylic acid, methacrylic acid, and esters and salts thereof; maleic acid, fumaric acid, and esters and anhydrides thereof; styrene; acrylonitrile; vinylidene chloride; vinyl ether; and the like. Of these vinyl compounds, vinyl chloride is preferred. The method for producing a vinyl polymer of the present invention is particularly suitably used in suspension polymerization of vinyl chloride alone, or suspension polymerization of vinyl chloride and a monomer copolymerizable with vinyl chloride. Examples of the monomer copolymerizable with vinyl chloride include: vinyl esters such as vinyl acetate and vinyl propionate; (meth)acrylic acid esters such as methyl (meth) acrylate and ethyl (meth)acrylate; $\alpha$-olefins such as ethylene and propylene; unsaturated dicarboxylic acids such as maleic anhydride and itaconic acid; acrylonitrile; styrene; vinylidene chloride; vinyl ether; and the like.

In the suspension polymerization of the vinyl compound in the method for producing a vinyl polymer of the present invention, a charging proportion of each component, a polymerization temperature, a polymerization time period, and the like may be similar to conditions that have been conventionally adopted in suspension polymerization of a vinyl compound such as vinyl chloride. Furthermore, there is no limitation on a charging order and a ratio of the vinyl compound, the polymerization initiator, the dispersant, the aqueous medium, and the other additives.

In accordance with the method for producing a vinyl polymer of the present invention, stability in polymerization can improve, thereby enabling efficiently obtaining vinyl polymer particles in which the average particle diameter is small, with few coarse particles. Furthermore, the vinyl polymer particles to be obtained by the method for producing a vinyl polymer of the present invention are also favorable in plasticizer absorptivity.

EXAMPLES

Hereinafter, the present invention is explained in more detail by way of Examples, but the present invention is not in any way limited to these Examples. It is to be noted that each measurement method adopted in the following Examples and Comparative Examples is indicated below.

Viscosity-Average Degree of Polymerization of PVA

The viscosity-average degree of polymerization of the PVA was measured based on JIS K6726: 1994. Specifically, in a case in which the degree of saponification of the PVA was less than 99.5 mol %, the viscosity-average degree of polymerization was determined by the following equation, using a limiting viscosity [η] (L/g) measured in water at 30° C. on the PVA, which had been obtained upon being saponified until the degree of saponification became 99.5 mol % or more:

$$\text{viscosity-average degree of polymerization}=([\eta]\times 10^4/8.29)^{(1/0.62)}$$

Degree of Saponification of PVA

The degree of saponification of each PVA was determined by a method described in JIS K6726: 1994.

Content of Carbonyl Group in PVA

The content of the carbonyl group in the PVA was calculated by carrying out a $^1$H-NMR measurement. Each sample was subjected to Soxhlet washing with methyl acetate for 10 hrs, subjected to vacuum drying at 40° C. for 16 hrs to remove impurities, and then provided for the measurement. Using the sample prepared as a 1% by mass DMSO-$d_6$ solution (containing 0.03% by mass tetramethylsilane as an internal standard), the measurement was conducted at 400 MHz (80° C., cumulative times: 256). Of the methine groups of the main chain of the PVA, a peak of CH linked to an OH group appears at 3.8 to 4.0 ppm (integrated value [M]), and a peak of CH linked to an OAc group appears at 4.2 to 4.6 ppm (integrated value [N]). Furthermore, a peak of methylene groups adjacent to a formyl group and a carbonyl group appears at 2.3 to 2.5 ppm (integrated value [O]). Moreover, a peak of protons constituting formyl groups appears at 9.5 to 10.0 ppm (integrated value [P]). The content of the carbonyl group in the PVA was determined by using the following equation, as a value with respect to the structural units (the vinyl alcohol unit and the vinyl ester unit) derived from the vinyl alcohol monomer.

$$\text{content of carbonyl group (mol \%)}=[\{([O]/2)-[P]\}/([M]+[N])]\times 100$$

Content of Alkenyl Group in PVA

The content of the alkenyl group in the PVA was calculated by carrying out a $^1$H-NMR measurement. Each sample was subjected to Soxhlet washing with methyl acetate for 10 hrs, subjected to vacuum drying at 40° C. for 16 hrs to remove impurities, and then provided for the measurement. Using the sample prepared as a 1% by mass DMSO-$d_6$ solution (containing 0.03% by mass tetramethylsilane as an internal standard), the measurement was conducted at 400 MHz (80° C., cumulative times: 256). Of the methine groups of the main chain of the PVA, a peak of CH linked to an OH group appears at 3.8 to 4.0 ppm (integrated value [M]), and a peak of CH linked to an OAc group appears at 4.2 to 4.6 ppm (integrated value [N]). Furthermore, a peak of one proton (H at first position in ethenyl group; $CH_2$═C"H"—) constituting the vinyl group in the alkenyl group appears at 5.7 to 6.0 ppm (integrated value [Q]). The content of the alkenyl group in the PVA was determined by using the following equation, as a value with respect to the structural units (the vinyl alcohol unit and the vinyl ester unit) derived from the vinyl alcohol monomer.

$$\text{content of alkenyl group (mol \%)}=\{[Q]/([M]+[N])\}\times 100$$

Content of Formyl Group in PVA

The content of the carbonyl group in the PVA was calculated by carrying out a $^1$H-NMR measurement. Each sample was subjected to Soxhlet washing with methyl acetate for 10 hrs, subjected to vacuum drying at 40° C. for 16 hrs to remove impurities, and then provided for the measurement. Using the sample prepared as a 1% by mass DMSO-$d_6$ solution (containing 0.03% by mass tetramethylsilane as an internal standard), the measurement was conducted at 400 MHz (80° C., cumulative times: 256). Of the methine groups of the main chain of the PVA, a peak of CH linked to an OH group appears at 3.8 to 4.0 ppm (integrated value [M]), and a peak of CH linked to an OAc group appears at 4.2 to 4.6 ppm (integrated value [N]). A peak of protons constituting formyl groups appears at 9.5 to 10.0 ppm (integrated value [P]). The content of the formyl group in the PVA was determined by using the following equation, as a value with respect to the structural units (the vinyl alcohol unit and the vinyl ester unit) derived from the vinyl alcohol monomer.

$$\text{content of formyl group (mol \%)}=\{[P]/([M]+[N])\}\times 100$$

Example 1: Production of PVA-1

Into a reaction vessel equipped with a stirrer, a reflux condenser, a nitrogen inlet tube, and an addition port for a polymerization initiator were charged 1,600 parts by mass of vinyl acetate and 35.0 parts by mass of 7-octenal, and replacement with nitrogen in the system was carried out for 30 min while bubbling nitrogen. Elevation of the temperature of the reaction vessel was started, and 2.4 parts by mass of 2,2'-azobisisobutyronitrile (AIBN) were added to initiate the polymerization when an internal temperature of 60° C. was attained. After conducting the polymerization at 60° C. for 3 hrs, cooling was performed to stop the polymerization. A solid content concentration at the time of stopping the polymerization was 44.3% by mass, and a conversion (rate of polymerization) was 45%. Subsequently, unreacted monomer was eliminated while adding methanol at 30° C. under reduced pressure at intervals to give a methanol solution of a vinyl ester polymer (concentration: 38.2%). Next, to 58.0 parts by mass of a methanol solution of the vinyl ester polymer (34 parts by mass of the polymer in the solution) prepared by further adding methanol to this methanol solution were added 1.0 part by mass of a 10% by mass methanol solution of sodium hydroxide, 0.88 parts by mass of ion exchanged water, and 10 parts by mass of methyl acetate, and saponification was conducted at 40° C. (a concentration of the polymer in the saponification solution: 30% by mass, a moisture percentage of the saponification solution: 1% by mass, and a molar ratio of sodium hydroxide to the vinyl acetate unit in the polymer: 0.0072). Since gelatinous matter was produced about 15 min after the methanol solution of sodium hydroxide was added, the gelatinous matter was ground with a grinder, and the mixture was left to stand at 40° C. for 1 hour to allow saponification to proceed. Subsequently, 160 parts by mass of methyl acetate and 40 parts by mass of methanol were added thereto and the mixture was left to stand at 40° C. for 30 min to permit washing. After this operation for washing was repeated twice, a white solid obtained by deliquoring was vacuum-dried at 40° C. for 16 hrs, whereby a PVA (PVA-1) was obtained. Physical properties of the PVA-1 are shown in Table 2.

Examples 2, 3, 6 to 8, 10, 11, and 14, and Comparative Example 1: Production of PVA-2, 3, 6 to 8, 10, 11, 14, and 15

PVAs (PVA-2, 3, 6 to 8, 10, 11, 14, and 15) of Examples 2, 3, 6 to 8, 10, 11, and 14 and Comparative Example 1 were each produced by procedures similar to that of Example 1, except that changes were carried out such that polymerization conditions involving the amount of vinyl acetate charged and the type and the usage amount of the aldehyde (a) used in the polymerization; and saponification conditions involving the concentration of the vinyl ester polymer during the saponification and the molar ratio of the sodium hydroxide to the vinyl acetate unit were as shown in Table 1. In Examples 6 to 8 and 14, production was carried out by using the chain transfer agent (b) together with the aldehyde (a), as shown in Table 1. The physical properties of PVA-2, 3, 6 to 8, 10, 11, 14, and 15 are shown in Table 2.

Example 4: Production of PVA-4

Into a reaction vessel equipped with a stirrer, a reflux condenser, a nitrogen inlet tube, a chain transfer agent-dripping port, and an addition port for a polymerization initiator were charged 960 parts by mass of vinyl acetate, 640 parts by mass of methanol, and 17.5 parts by mass of 7-octenal, and replacement with nitrogen in the system was carried out for 30 min while bubbling nitrogen. Elevation of the temperature of the reaction vessel was started, and 1.5 parts by mass of 2,2'-azobisisobutyronitrile (AIBN) were added to initiate the polymerization when an internal temperature of 60° C. was attained. After conducting the polymerization at 60° C. for 3 hrs, cooling was performed to stop the polymerization. A solid content concentration at the time of stopping the polymerization was 39.4% by mass, and a conversion was 65%. Subsequently, unreacted monomer was eliminated while adding methanol at 30° C. under reduced pressure at intervals to give a methanol solution of a vinyl ester polymer (concentration: 40.5%). Next, to 58.1 parts by mass of a methanol solution of the vinyl ester polymer (30 parts by mass of the polymer in the solution) prepared by further adding methanol to this methanol solution were added 1.0 part by mass of a 10% by mass methanol solution of sodium hydroxide, 0.88 parts by mass of ion exchanged water, and 10 parts by mass of methyl acetate, and saponification was conducted at 40° C. (a concentration of the polymer in the saponification solution: 30% by mass, a moisture percentage of the saponification solution: 1% by mass, and a molar ratio of sodium hydroxide to the vinyl acetate unit in the polymer: 0.0075). Since gelatinous matter was produced about 10 min after the methanol solution of sodium hydroxide was added, the gelatinous matter was ground with a grinder, and the mixture was left to stand at 40° C. for 1 hour to allow saponification to proceed. Subsequently, 160 parts by mass of methyl acetate and 40 parts by mass of methanol were added thereto and the mixture was left to stand at 40° C. for 30 min to permit washing. After this operation for washing was repeated twice, a white solid obtained by deliquoring was vacuum-dried at 40° C. for 16 hrs, whereby a PVA (PVA-4) was obtained. Physical properties of the PVA-4 are shown in Table 2.

Examples 5 and 9, and Comparative Example 3: Production of PVA-5, 9, and 17

PVAs (PVA-5, 9, and 17) of Examples 5 and 9 and Comparative Example 3 were each produced by procedures similar to that of Example 4, except that changes were carried out such that polymerization conditions involving the amounts of vinyl acetate and methanol charged and the type and the usage amount of the aldehyde (a) used in the polymerization; and saponification conditions involving the concentration of the vinyl ester polymer during the saponification and the molar ratio of the sodium hydroxide to the vinyl acetate unit were as shown in Table 1. In Comparative Example 3, production was carried out without using the aldehyde (a). The physical properties of PVA-5, 9, and 17 are shown in Table 2.

Example 12: PVA-12

Into a reaction vessel equipped with a stirrer, a reflux condenser, a nitrogen inlet tube, a chain transfer agent-dripping port, and an addition port for a polymerization initiator were charged 1,050 parts by mass of vinyl acetate, 450 parts by mass of methanol, and 9.0 parts by mass of 7-octenal, and replacement with nitrogen in the system was carried out for 30 min while bubbling nitrogen. Elevation of the temperature of the reaction vessel was started, and 1.1 parts by mass of 2,2'-azobisisobutyronitrile (AIBN) were added to initiate the polymerization when an internal temperature of 60° C. was attained. A methanol solution of 3-mercaptopropionate (concentration of 6% by mass) as the chain transfer agent (b) was added dropwise into the reaction vessel. The dropwise addition was performed while maintaining a composition ratio with vinyl acetate in the polymerization solution to be constant (total amount added dropwise: 43.3 parts by mass), and after conducting the polymerization at 60° C. for 4 hrs, cooling was performed to stop the polymerization. A solid content concentration at the time of stopping the polymerization was 27.6% by mass, and a conversion was 40%. Subsequently, unreacted monomer was eliminated while adding methanol at 30° C. under reduced pressure at intervals to give a methanol solution of a vinyl ester polymer (concentration: 54.0%). Next, to 93.7 parts by mass of a methanol solution of the vinyl ester polymer (42.6 parts by mass of the polymer in the solution) prepared by further adding methanol to this methanol solution were added 6.3 parts by mass of a 10% by mass methanol solution of sodium hydroxide and 0.88 parts by mass of ion exchanged water, and saponification was conducted at 40° C. (a concentration of the polymer in the saponification solution: 40% by mass, a moisture percentage of the saponification solution: 1% by mass, and a molar ratio of sodium hydroxide to the vinyl acetate unit in the polymer: 0.0298). This mixture was left to stand at 40° C. for 1 hour to allow saponification to proceed. Subsequently, 160 parts by mass of methyl acetate and 40 parts by mass of methanol were added thereto and the mixture was left to stand at 40° C. for 30 min to permit washing. After this operation for washing was repeated twice, a white solid obtained by deliquoring was vacuum-dried at 40° C. for 16 hrs, whereby a PVA (PVA-12) was obtained. Physical properties of the PVA-12 are shown in Table 2.

Example 13: Production of PVA-13

PVA-13 of Example 13 was produced by a procedure similar to that of Example 12, except that changes were carried out such that polymerization conditions involving the amounts of vinyl acetate and methanol charged, and the usage amounts of the aldehyde (a) and 3-mercaptopropionate, serving as the chain transfer agent (b), used in the polymerization; and saponification conditions involving the concentration of the vinyl ester polymer during the saponification and the molar ratio of the sodium hydroxide to the vinyl acetate unit were as shown in Table 1.

Comparative Example 2: Production of PVA-16

One hundred parts by mass of a powder of PVA-16, obtained as described above, were immersed for 3 hrs in 500 parts by mass of a methanol solution of 7-octenal (0.5% by mass). Subsequently, 30 parts by mass of a 1 N aqueous hydrochloric acid solution were added to a resulting mixture, and a reaction was allowed at 40° C. for 2 hrs. Subsequently, neutralization was conducted with 30 parts by mass of a 1 N aqueous sodium hydroxide solution, and a resulting reaction solution was removed by filtering. Thereafter, 160 parts by mass of methyl acetate and 40 parts by mass of methanol were added thereto, and a resulting mixture was left to stand at 40° C. for 30 min to permit washing. After this operation for washing was repeated twice, a white solid obtained by deliquoring was vacuum-dried at 70° C. for 16 hrs to give an acetalized PVA (PVA-16) of Comparative Example 2. Physical properties of the PVA-16 are shown in Table 2.

Evaluations

Suspension polymerization of vinyl chloride was carried out by the following method by using each PVA obtained in Examples 1 to 11 and Comparative Examples 1 to 3 as a dispersant for suspension polymerization. Next, particles of the vinyl chloride polymer obtained were evaluated on the average particle diameter, the amount of coarse particles, and the plasticizer absorptivity. The evaluation results are shown in Table 2.

Suspension Polymerization of Vinyl Chloride

Each PVA shown in Table 2 was dissolved in deionized water so as to reach an amount equivalent to 1,000 ppm with respect to the vinyl chloride to prepare an aqueous dispersant liquid (A), and 100 parts by mass thereof were charged into an autoclave having a volume of 5 L. Furthermore, as the PVA (B), a vinyl alcohol polymer having a viscosity-average degree of polymerization of 450 and a degree of saponification of 40 mol % was dissolved in deionized water so as to reach an amount equivalent to 300 ppm with respect to the vinyl chloride to prepare an aqueous dispersant solution (B), and 100 parts by mass thereof were charged. Next, deionized water was added such that a total of deionized water was 1,200 parts by mass. Subsequently, 0.65 parts by mass of a 70% by mass toluene solution of cumyl peroxyneodecanoate, and 1.05 parts by mass of a 70% by mass toluene solution of t-butyl peroxyneodecanoate were charged thereinto. Degassing was performed to remove oxygen such that pressure inside the autoclave was 0.0067 MPa. Thereafter, 800 parts by mass of vinyl chloride were charged thereinto, and a temperature of the contents inside the autoclave was raised to 57° C. to start polymerization with stirring. At the time of starting the polymerization, the pressure inside the autoclave was 0.83 MPa. The polymerization was terminated when 3.5 hrs had passed from the start of the polymerization and the pressure inside the autoclave had reached 0.70 MPa, and unreacted vinyl chloride was removed. Subsequently, a polymerization slurry was taken out and drying was performed at 65° C. for 17 hrs to give vinyl chloride polymer particles.

(1) Average Particle Diameter of Vinyl Chloride Polymer Particles

A particle diameter distribution of the vinyl chloride polymer particles obtained was measured by a dry sieve analysis using a wire mesh with a Tyler mesh standard. Results thereof were plotted in accordance with the Rosin-Rammler distribution equation, and an average particle diameter ($d_{p50}$; median diameter) was calculated.

(2) Amount of Coarse Particles of Vinyl Chloride Polymer Particles

A content of the vinyl chloride polymer particles obtained, which did not pass through a sieve having a mesh opening size of 250 μm (60 mesh in terms of mesh of JIS-standard sieve) was determined in terms of % by mass. The value being lower indicates fewer coarse particles, suggesting that the dispersant (PVA) used is superior in polymerization stability.

(3) Plasticizer Absorptivity (CPA) of Vinyl Chloride Polymer Particles

A mass of a syringe having a volume of 5 mL, packed with 0.02 g of absorbent cotton, was weighed (defined as A (g)), and then a mass after charging thereinto 0.5 g of the vinyl chloride polymer particles was weighed (defined as B (g)). Thereinto was charged 1 g of dioctyl phthalate (DOP), and the syringe was left to stand for 15 min. Subsequently, centrifugal separation was performed under conditions involving 3,000 rpm and 40 min to remove unabsorbed DOP, and a mass after removal was weighed (defined as C (g)). Then, the plasticizer absorptivity (%) of the vinyl chloride polymer particles was determined by the following calculation formula. The plasticizer absorptivity being higher indicates that processing is easier, suggesting mainly that defects generated in the appearance, such as aggregates, are unlikely to appear during processing into a sheet. In this evaluation, the plasticizer absorptivity was assessed as being favorable in a case in which the plasticizer absorptivity was 28.0% or more.

$$\text{plasticizer absorptivity (\%)}=100\times[\{C-A)/(B-A)\}-1]$$

TABLE 1

| | PVA | Usage Amount | | | | | | |
|---|---|---|---|---|---|---|---|---|
| | | Vinyl acetate (parts by mass) | Methanol (parts by mass) | Aldehyde (a) type | Aldehyde (a) (parts by mass) | Chain transfer agent (b) type | Chain transfer agent (b) (parts by mass) | AIBN (parts by mass) |
| Example 1 | PVA-1 | 1600 | 0 | 7-octenal | 35.0 | — | — | 2.4 |
| Example 2 | PVA-2 | 1600 | 0 | 7-octenal | 35.0 | — | — | 2.4 |
| Example 3 | PVA-3 | 1600 | 0 | 7-octenal | 35.0 | — | — | 2.4 |
| Example 4 | PVA-4 | 960 | 640 | 7-octenal | 17.5 | — | — | 1.5 |
| Example 5 | PVA-5 | 960 | 640 | 7-octenal | 17.5 | — | — | 1.5 |
| Example 6 | PVA-6 | 1600 | 0 | 7-octenal | 17.5 | acetaldehyde | 15 | 1.5 |
| Example 7 | PVA-7 | 1600 | 0 | 7-octenal | 17.5 | acetaldehyde | 15 | 1.5 |
| Example 8 | PVA-8 | 1600 | 0 | 7-octenal | 17.5 | acetaldehyde | 15 | 1.5 |
| Example 9 | PVA-9 | 1568 | 32 | 7-octenal | 14.1 | acetaldehyde | 16 | 0.5 |
| Example 10 | PVA-10 | 1600 | 0 | 10-undecenal | 43.0 | — | — | 1.8 |
| Example 11 | PVA-11 | 1600 | 0 | 4-pentenal | 18.0 | — | — | 1.6 |
| Example 12 | PVA-12 | 1050 | 491 | 7-octenal | 9.0 | 3-mercaptopropionate | 2.6 | 1.1 |
| Example 13 | PVA-13 | 1050 | 562 | 7-octenal | 30.3 | 3-mercaptopropionate | 5.9 | 2.4 |
| Example 14 | PVA-14 | 1600 | 0 | 7-octenal | 17.5 | acetaldehyde | 250 | 4.8 |
| Comparative Example 1 | PVA-15 | 1600 | 0 | acetaldehyde | 28.0 | — | — | 0.9 |
| Comparative Example 2 | PVA-16 | 612 | 588 | (7-octenal) | 0.0 | — | — | 1.0 |
| Comparative Example 3 | PVA-17 | 612 | 588 | — | — | — | — | 1.0 |

| | PVA | Polymerization temperature (° C.) | Conversion (%) | Saponification Conditions: Concentration of vinyl ester polymer (% by mass) | Molar ratio of NaOH | Moisture percentage (% by mass) |
|---|---|---|---|---|---|---|
| Example 1 | PVA-1 | 60 | 45 | 30 | 0.0072 | 1 |
| Example 2 | PVA-2 | 60 | 45 | 30 | 0.0112 | 1 |
| Example 3 | PVA-3 | 60 | 45 | 30 | 0.0117 | 1 |
| Example 4 | PVA-4 | 60 | 65 | 30 | 0.0075 | 1 |
| Example 5 | PVA-5 | 60 | 65 | 30 | 0.0100 | 1 |
| Example 6 | PVA-6 | 60 | 45 | 30 | 0.0128 | 1 |
| Example 7 | PVA-7 | 60 | 45 | 30 | 0.0130 | 1 |
| Example 8 | PVA-8 | 60 | 45 | 30 | 0.0128 | 1 |
| Example 9 | PVA-9 | 70 | 60 | 30 | 0.0093 | 1 |
| Example 10 | PVA-10 | 60 | 45 | 30 | 0.0087 | 1 |
| Example 11 | PVA-11 | 60 | 45 | 30 | 0.0079 | 1 |
| Example 12 | PVA-12 | 60 | 40 | 40 | 0.0298 | 1 |
| Example 13 | PVA-13 | 60 | 40 | 40 | 0.0178 | 1 |
| Example 14 | PVA-14 | 60 | 65 | 40 | 0.0347 | 1 |
| Comparative Example 1 | PVA-15 | 60 | 45 | 30 | 0.0097 | 1 |
| Comparative Example 2 | PVA-16 | 60 | 70 | 25 | 0.0071 | 1 |
| Comparative Example 3 | PVA-17 | 60 | 70 | 25 | 0.0071 | 1 |

TABLE 2

| | PVA | Physical Properties | | | | | Evaluations | | |
|---|---|---|---|---|---|---|---|---|---|
| | | Viscosity-average degree of polymerization | Degree of saponification (mol %) | Content (mol %) carbonyl group | Content (mol %) alkenyl group | Content (mol %) formyl group | Average particle diameter (μm) | Amount of coarse particles (% by mass) | Plasticizer absorptivity (%) |
| Example 1 | PVA-1 | 620 | 70.0 | 0.05 | 0.26 | 0.36 | 136 | 1.6 | 30.7 |
| Example 2 | PVA-2 | 620 | 76.4 | 0.03 | 0.27 | 0.32 | 95 | 1.9 | 28.4 |
| Example 3 | PVA-3 | 620 | 79.6 | 0.04 | 0.26 | 0.35 | 104 | 2.0 | 31.8 |
| Example 4 | PVA-4 | 590 | 71.6 | 0.01 | 0.08 | 0.22 | 148 | 1.0 | 29.1 |
| Example 5 | PVA-5 | 590 | 76.7 | 0.01 | 0.09 | 0.24 | 106 | 1.4 | 28.8 |
| Example 6 | PVA-6 | 445 | 72.8 | 0.01 | 0.14 | 0.15 | 139 | 1.3 | 32.2 |
| Example 7 | PVA-7 | 445 | 74.4 | 0.02 | 0.13 | 0.14 | 125 | 3.3 | 33.2 |
| Example 8 | PVA-8 | 445 | 78.6 | 0.01 | 0.15 | 0.15 | 141 | 2.6 | 29.3 |
| Example 9 | PVA-9 | 480 | 72.5 | 0.03 | 0.03 | 0.15 | 119 | 1.8 | 34.6 |
| Example 10 | PVA-10 | 720 | 72.3 | 0.03 | 0.09 | 0.13 | 140 | 2.5 | 33.0 |

TABLE 2-continued

| | | Physical Properties | | | | | Evaluations | | |
|---|---|---|---|---|---|---|---|---|---|
| | | Viscosity-average | Degree of | Content (mol %) | | | Average | Amount of | Plasticizer |
| | PVA | degree of polymerization | saponification (mol %) | carbonyl group | alkenyl group | formyl group | particle diameter (μm) | coarse particles (% by mass) | absorptivity (%) |
| Example 11 | PVA-11 | 800 | 71.1 | 0.01 | 0.07 | 0.08 | 130 | 1.1 | 30.1 |
| Example 12 | PVA-12 | 200 | 45.8 | 0.03 | 0.17 | 0.29 | | not performed | |
| Example 13 | PVA-13 | 90 | 49.6 | 0.40 | 0.50 | 0.80 | | not performed | |
| Example 14 | PVA-14 | 60 | 63.8 | 0.01 | 0.05 | 0.06 | | not performed | |
| Comparative Example 1 | PVA-15 | 760 | 73.0 | 0.11 | 0.00 | 0.00 | 210 | 40.8 | 33.9 |
| Comparative Example 2 | PVA-16 | 750 | 72.5 | 0.00 | 0.44 | 0.00 | 180 | 12.1 | 26.8 |
| Comparative Example 3 | PVA-17 | 750 | 72.5 | 0.00 | 0.00 | 0.00 | | measurement failed due to blocking | |

As shown in Table 2, each of the PVAs of Examples 1 to 11 had a carbonyl group, a formyl group, and an alkenyl group, and in a case of using any one of these as a dispersant for suspension polymerization, obtaining vinyl chloride polymer particles which were superior in plasticizer absorptivity, and in which the average particle diameter was small, with few coarse particles was enabled. It was confirmed that each of the PVAs of Examples 1 to 11 was useful as a dispersant for suspension polymerization. It is to be noted that since, for example, the unsaturated aliphatic aldehyde was copresent during the synthesis and the alkenyl group and the carbonyl group were confirmed to be present in the PVA, it can be speculated that in each of the PVAs of the Examples, a group represented by the formula (2) was formed at the end of the polymer chain.

On the other hand, PVA-15 of Comparative Example 1 had neither an alkenyl group nor a formyl group, and the average particle diameter of the vinyl chloride polymer particles obtained was large, with many coarse particles. PVA-16 of Comparative Example 2 had neither a carbonyl group nor a formyl group, and the average particle diameter of the vinyl chloride polymer particles obtained was large, with many coarse particles. Furthermore, the plasticizer absorptivity of the vinyl chloride polymer particles obtained was low. In the case of PVA-17 of Comparative Example 3, the vinyl chloride polymer underwent blocking, whereby the evaluations could not be performed.

INDUSTRIAL APPLICABILITY

The PVA of the present invention can be used for, e.g., a dispersant in suspension polymerization of a vinyl compound.

The invention claimed is:

1. A vinyl alcohol polymer, comprising, in the same molecule or in different molecules:

a carbonyl group, in which two atomic bonds both bond to a carbon atom;

a formyl group; and a vinyl group of formula (5) comprising an alkenyl group at a first end of a polymer chain:

$$H_2C{=}CH{-}(CH_2)_n{-}, \quad (5)$$

wherein, in the formula (5), n is an integer in a range of from 1 to 11, wherein the vinyl alcohol polymer is one molecule or a mixture of multiple different vinyl alcohol polymers.

2. The vinyl alcohol polymer of claim 1, comprising a carbonyl structure of formula (1) comprising the carbonyl group:

(1)

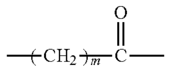

wherein, in the formula (1), m is an integer in a range of from 1 to 11.

3. A vinyl alcohol polymer, comprising, at a second end of a polymer chain, a carbonyl side group of formula (2):

(2)

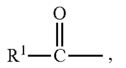

wherein, in the formula (2), $R^1$ is an alkenyl group comprising a methylene group at an end of the carbonyl side group.

4. The vinyl alcohol polymer of claim 1, comprising a tertiary carbon atom.

5. The vinyl alcohol polymer of claim 1, comprising a structural unit derived from an unsaturated aliphatic aldehyde.

6. The vinyl alcohol polymer of claim 5, wherein the unsaturated aliphatic aldehyde has 3 to 14 carbon atoms.

7. The vinyl alcohol polymer of claim 5, wherein the unsaturated aliphatic aldehyde comprises, at an end thereof, a carbon-carbon double bond.

8. A method for producing the vinyl alcohol polymer of claim 1, the method comprising:

polymerizing a vinyl ester in a presence of an unsaturated aliphatic aldehyde to obtain a vinyl ester polymer; and saponifying the vinyl ester polymer.

9. A dispersant for suspension polymerization, the dispersant comprising:

the vinyl alcohol polymer of claim 1.

10. A dispersion aid for suspension polymerization, the dispersion aid comprising:

the vinyl alcohol polymer of claim 1.

11. A method for producing a vinyl polymer, the method comprising:

polymerizing a vinyl compound in a presence of the vinyl alcohol polymer of claim 1.

12. The vinyl alcohol polymer of claim 1, wherein, in the formula (5), n is an integer in a range of from 2 to 9.

13. The vinyl alcohol polymer of claim 1, wherein, in the formula (5), n is an integer in a range of from 3 to 7.

14. The vinyl alcohol polymer of claim 1, comprising an aliphatic aldehyde-derived unit of formula (3):

(3)

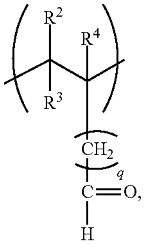

wherein $R^2$ to $R^4$ are each independently a hydrogen atom or an alkyl group having 1 to 3 carbon atoms, and q is an integer of in a range of from 1 to 11.

15. The vinyl alcohol polymer of claim 14, wherein, in the formula (3), $R^2$ to $R^4$ are each a hydrogen atom, and q is an integer in a range of from 2 to 9.

16. The vinyl alcohol polymer of claim 14, wherein, in the formula (3), $R^2$ to $R^4$ are each a hydrogen atom, and q is an integer in a range of from 3 to 7.

17. The vinyl alcohol polymer of claim 1, comprising an aliphatic aldehyde-derived unit of formula (4):

(4)

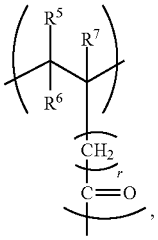

wherein $R^5$ to $R^7$ are each independently a hydrogen atom or an alkyl group having 1 to 3 carbon atoms, and r is an integer of in a range of from 1 to 11.

18. The vinyl alcohol polymer of claim 14, wherein, in the formula (3), $R^5$ to $R^7$ are each a hydrogen atom, and r is an integer in a range of from 2 to 9.

19. The vinyl alcohol polymer of claim 14, wherein, in the formula (3), $R^5$ to $R^7$ are each a hydrogen atom, and r is an integer in a range of from 3 to 7.

20. The vinyl alcohol polymer of claim 5, wherein the unsaturated aliphatic aldehyde is 2-propenal, 3-butenal, 4-pentenal, 5-hexenal, 3-methyl-5-hexanal, 6-heptenal, 6-octenal, 7-octenal, 7-methyl-7-octenal, 3,7-dimethyl-7-octenal, 8-nonenal, 9-decenal, 10-undecenal, or 11-dodecenal.

* * * * *